US012621154B2

(12) United States Patent
Coughlan et al.

(10) Patent No.: US 12,621,154 B2
(45) Date of Patent: May 5, 2026

(54) DEVICES AND METHODS FOR CONSOLIDATING SERIALIZED TOKENS

(71) Applicant: nChain Licensing AG, Zug (CH)

(72) Inventors: Steven Patrick Coughlan, London (GB); Wei Zhang, London (GB); Chloe Tartan, London (GB)

(73) Assignee: nChain Licensing AG, Zug (CH)

( * ) Notice: Subject to any disclaimer, the term of this patent is extended or adjusted under 35 U.S.C. 154(b) by 240 days.

(21) Appl. No.: 18/288,556

(22) PCT Filed: Apr. 26, 2022

(86) PCT No.: PCT/EP2022/061050

§ 371 (c)(1),
(2) Date: Oct. 26, 2023

(87) PCT Pub. No.: WO2022/229184

PCT Pub. Date: Nov. 3, 2022

(65) Prior Publication Data

US 2024/0223372 A1      Jul. 4, 2024

(30) Foreign Application Priority Data

Apr. 30, 2021    (GB) ..................................... 2106204

(51) Int. Cl.
*H04L 9/32*           (2006.01)
(52) U.S. Cl.
CPC .......... *H04L 9/3213* (2013.01); *H04L 9/3236* (2013.01)
(58) Field of Classification Search
CPC .................................................. H04L 9/3213
See application file for complete search history.

(56) References Cited

U.S. PATENT DOCUMENTS

| | | | | |
|---|---|---|---|---|
| 12,045,789 B2* | 7/2024 | Yantis | .................. | G06Q 20/326 |
| 12,131,326 B2* | 10/2024 | Buradagunta | ........ | G06Q 20/341 |

(Continued)

FOREIGN PATENT DOCUMENTS

| | | |
|---|---|---|
| DE | 102019002732 A1 | 10/2020 |
| JP | 3989762 B2 | 10/2007 |

OTHER PUBLICATIONS

International Search Report and Written Opinion for PCT/EP2022/061050 dated Aug. 25, 2022, 13 pages.

(Continued)

*Primary Examiner* — Simon P Kanaan
(74) *Attorney, Agent, or Firm* — Galvani Smith PLLC

(57) ABSTRACT

Methods and computing devices for consolidating tokens in a token system. The method may include receiving an instruction to consolidate two or more serialized tokens, each token having a respective serial number that includes a root identifier, a denomination code, and a leaf identifier allocated to that denomination code. The tokens are of denominations that, when summed, equate to a larger denomination. The method may include identifying a candidate root identifier and candidate leaf identifier, wherein the candidate leaf identifier is allocated to the larger denomination; determining that the candidate root identifier and the candidate leaf identifier are available for use; generating a new token having a new serial number containing the candidate root identifier, the candidate leaf identifier, and a denomination code corresponding to the larger denomination; and notifying an issuer computing device of consolidation and deactivation of the two or more serialized tokens resulting in the new token.

20 Claims, 9 Drawing Sheets

(56) References Cited

U.S. PATENT DOCUMENTS

| 2021/0233200 A1* | 7/2021 | Meltzer | G06Q 50/34 |
| 2022/0198559 A1* | 6/2022 | Dalton | H04L 63/101 |
| 2024/0086876 A1* | 3/2024 | Stroke | G06Q 20/3678 |
| 2024/0211904 A1* | 6/2024 | Coughlan | G06Q 20/405 |

OTHER PUBLICATIONS

Tony Eng et al: "Single-term divisible electronic coins", May 9, 1994 (May 9, 1994) Advances in Cryptology Eurocrypt '94, pp. 306-319, Springer Berlin Heidelberg, Berlin, Heidelberg.

* cited by examiner

502 — Receive request to generate token of selected denomination

504 — Assign unique root identifier

506 — Generate token with serial number including denomination code for selected denomination, unique root identifier, and leaf identifier 508 — Store in token database and mark active 510 — Send to requesting node

700

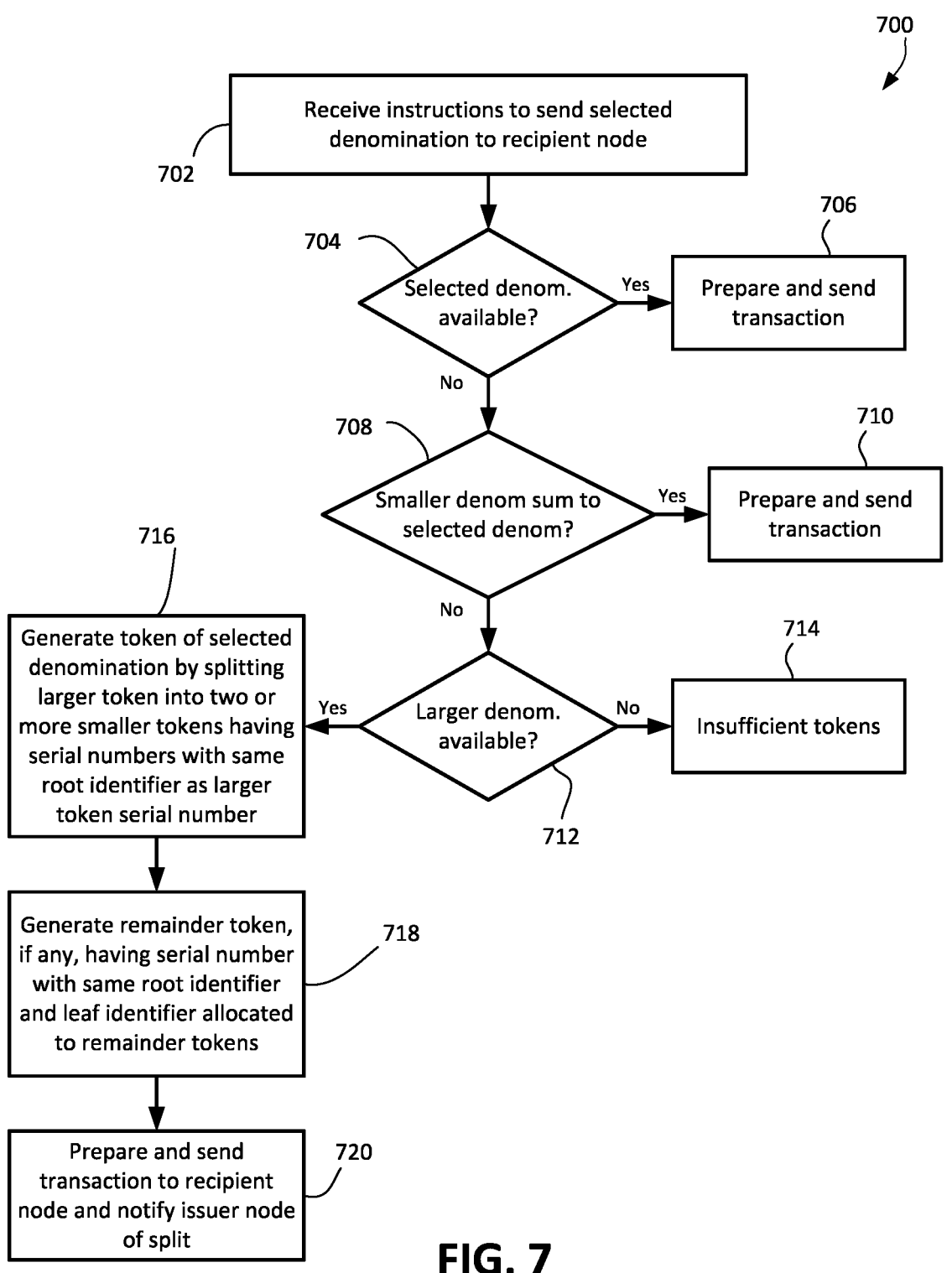

702
Receive instructions to send selected denomination to recipient node

704
Selected denom. available?

Yes → 706
Prepare and send transaction

No

708
Smaller denom sum to selected denom?

Yes → 710
Prepare and send transaction

No

712
Larger denom. available?

No → 714
Insufficient tokens

Yes → 716
Generate token of selected denomination by splitting larger token into two or more smaller tokens having serial numbers with same root identifier as larger token serial number 718
Generate remainder token, if any, having serial number with same root identifier and leaf identifier allocated to remainder tokens 720
Prepare and send transaction to recipient node and notify issuer node of split

FIG. 7

DEVICES AND METHODS FOR CONSOLIDATING SERIALIZED TOKENS

CROSS REFERENCE TO RELATED APPLICATIONS

This application is the U.S. National Stage of International Application No. PCT/EP2022/061050 filed on Apr. 26, 2022, which claims the benefit of United Kingdom Patent Application No. 2106204.7, filed on Apr. 30, 2021, the contents of which are incorporated herein by reference in their entireties.

TECHNICAL FIELD

The present disclosure relates to token networks and, in particular, methods and systems for serializing tokens, tracking serialized tokens, transferring serialized tokens, or combining serialized tokens.

BACKGROUND

Token systems are of increasing interest in the computer networking world. Many real world objects are being "tokenized", such as works of art, shares of a company, or even "tweets". In some cases, the thing being tokenized is a non-fungible good, like a singular work of art or other object, and the token associated with that item may represent 'ownership' of that non-fungible item. This has led to the recent popularity of non-fungible tokens (NFTs). Tokens may be issued, transferred or stored on a token network. The token network may be established on an underlying computing network, which may or may not involve a blockchain layer for maintaining a distributed ledger of token ownership.

Fungible tokens may be generated in some token system, for example tokens representing a quantity of fungible goods, or banknotes, or other non-unique items. Tracking individual tokens in a fungible token system can be costly in terms of storage space. For example, if we consider the number of banknotes that a sizeable country, such as Australia, the United Kingdom, or the United States, has in active circulation, then issuing a unique token having a unique serial number for each banknote result in very significant token database storage requirements.

It would be advantageous to have methods and systems for issuing, storing, transferring, splitting, and combining fungible serialized tokens that at least partially addresses the issue of storage space.

BRIEF DESCRIPTION OF THE DRAWINGS

Reference will now be made, by way of example, to the accompanying drawings which show example embodiments of the present application and in which:

FIG. 7 shows, in flowchart form, one example method of splitting a serialized token;

Like reference numerals are used in the drawings to denote like elements and features.

DETAILED DESCRIPTION OF EXAMPLES

Figure 1:
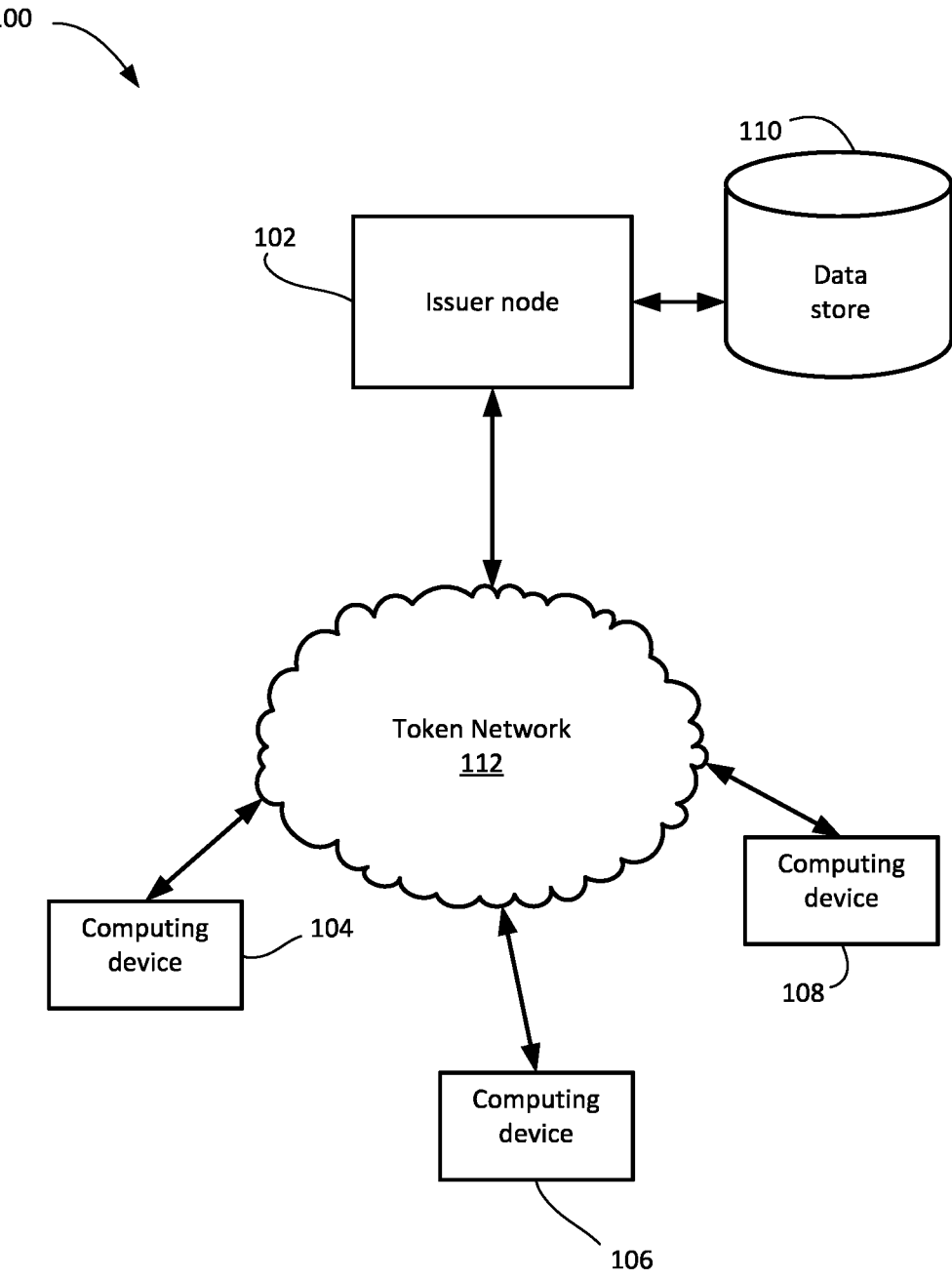
FIG. 1 shows an example token system.

In one aspect, there may be provided a computer-implemented method of consolidating tokens by a computing device in a token system. The method may include receiving an instruction to consolidate two or more serialized tokens, each token having a respective serial number, each serial number containing a respective root identifier, a denomination code, and a leaf identifier allocated to that denomination code. The denomination codes for the two or more serialized tokens may represent denominations selected from among a defined ordered set of denominations that when summed equate to a larger denomination from the defined ordered set of denominations. The method may further include identifying a candidate root identifier and candidate leaf identifier, wherein the candidate leaf identifier is allocated to the larger denomination; determining that the candidate root identifier and the candidate leaf identifier, in combination, are available for use; generating a new token having a new serial number containing the candidate root identifier, the candidate leaf identifier, and a denomination code corresponding to the larger denomination; and notifying an issuer computing device of consolidation and deactivation of the two or more serialized tokens resulting in the new token.

In some implementations, a bit-space for root identifiers is partitioned into a first bit-space of root identifiers associated with issued tokens and a second bit-space of root identifiers associated with consolidated tokens, and identifying a candidate root identifier may include selecting the candidate root identifier from the second bit-space. In some cases, selecting includes generating the candidate root identifier using a hash function. Using the hash function may include concatenating the respective root identifiers of the two or more serialized tokens and hashing the result. In some cases, if the hashing produces a first root identifier within the first bit-space then the device may re-hash the first root identifier until the candidate root identifier is produced.

In some implementations, determining that the candidate root identifier is available includes transmitting a message to an issuer computing device regarding the candidate root identifier and receiving a response message confirming the candidate root identifier is available.

In some implementations, determining that the candidate root identifier is available includes querying a token database and receiving a query result indicating that the token database does not contain the candidate root identifier.

In some implementations, identifying a candidate root identifier and candidate leaf identifier includes selecting one of the respective root identifiers and selecting a leaf identifier designated for consolidated tokens at the larger denomination. In some cases, selecting a leaf identifier designated for consolidated tokens at the larger denomination includes selecting a first leaf identifier, determining that the first leaf identifier is unavailable, selecting the candidate leaf identifier, and determining that the candidate leaf identifier is available. In some cases, selecting the leaf identifier includes sending a message to an issuer computing device and receiving a response indicating the candidate leaf identifier available.

In some implementations, each leaf identifier indicates a unique path from a root denomination in the defined ordered set of denominations to a respective node corresponding to that leaf identifier in a root denomination tree, and the root denomination tree maps splitting of the root denomination into successively smaller denominations in the defined ordered set of denominations. In some cases, the candidate leaf identifier is a leaf identifier not included in the root denomination tree and allocated to consolidated tokens.

In some implementations, the method may further include, at the issue computing device, removing the respective serial numbers of the two or more serialized tokens from a token database and storing the new serial number for the new token in the token database.

In another aspect, there may be provided a computing device implementing a node on a token network. The token network may be a distributed ledger network in some implementations. The computing device may include memory, one or more processors, and computer-executable instructions that, when executed, cause the processors to carry out one or more of the methods described herein.

In yet another aspect, there may be provided a computer-readable medium storing processor-executable instructions, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 shows an example system 100 for implementing a token network. The system 100 may facilitate the creation, tracking, storage, and transfer of tokens. The tokens themselves may be representative of any real-world item. Examples include property interests, shares, currency, cryptocurrency, loyalty points, credits, or any other thing that may be quantified.

Tokens may be non-fungible or fungible. A non-fungible token (NFT) may be specific to a unique real-world item. Fungible tokens represent things where at least some of those things may be interchangeable. As an example a fungible token system may be created in which apples are tokenized such that a token represents a certain quantity of apples, like a bushel. Any one token represents ownership of a quantity of apples, and not ownership of a specific bushel of apples. Tokens can be mapped to a thing structured in denominations. For example, different quantities or sub-quantities of apples. In another example, a token system could tokenize a fiat currency, each token representing a certain denomination of banknote, like $20, $10, $5, as defined by the currency denominations. Other systems may involve denominations of any other fungible thing such as oranges, memory storage, CPU time, etc.

The system 100 includes an issuer node 102 and a plurality of user nodes, including a first user 104, a second user 106, and a third user 108, all interconnected by way of a computer network 112. The computer network may include a packet-switched network, such as a wide-area internetwork like the Internet. Each node 102, 104, 106, 108 includes a computing device configured to connect to and communicate with other nodes via the computer network 112. The computing device may include, in some examples, servers, personal computers, laptops, tablets, smart phones, wearable technology, or the like.

In some implementations, the system 100 may be implemented using blockchain technology, such as Bitcoin or other protocols. In some implementations, the system 100 may be implemented using a non-blockchain peer-to-peer protocol for transactions. In some implementations, the system 100 may be implemented using a non-peer-to-peer protocol for transactions in which the issuer node 102 or other intermediary node is involved in authorizing and facilitating transactions between user nodes.

The issuer node 102 is coupled to a data store 110 within which it stores and maintains data regarding tokens. The issuer node 102 generates tokens in accordance with its governing protocol and maintains a record of generated tokens in the data store 110. Each token is uniquely identifiable by way of its serial number. The data store 110 maintains a record of all validly issued tokens. In this manner, it is possible for a user node to determine, through the issuer node 102, whether a specific token is a valid issued token by querying its serial number. In this sense, the issuer node is a trusted third party engaged in tracking the validity of token serial numbers. Note that the issuer node 102 does not necessarily track or maintain ownership information with respect to individual tokens. That is, in some implementations, the data store tracks whether particular token serial numbers are issued and active, but does not track ownership information for those tokens. Ownership data may be tracked using another mechanism, such as an underlying blockchain technology or another token transfer protocol.

The issuer node 102 is configured to generate and issue tokens. Issued tokens are tracked in a database or other such data structured stored in the data store 110. One of the user nodes, such as the first user node 104, may take possession or ownership of a plurality of tokens and may transfer one or more tokens to another user node, such as the second user node 106. The underlying transfer protocol, whether blockchain-based or not, may govern the mechanism for securely transferring possession and/or ownership of a token. For example, in a blockchain-based protocol, transfer of a token from the first node 104 to the second node 106 may be carried out by way of a transaction signed by a private key associated with the first node 104, payable to a public key associated with the second node 106, and specifying the token serial number in the transaction.

One of the challenges of a token network is the data space required to uniquely identify each token. In other words, with a large quantity of tokens, tracking the serial numbers of all issued tokens can result in very large memory requirements for the data store 110. To illustrate by way of comparative example, consider the number of banknotes in circulation in a given currency. There are approximately 45 billion USD banknotes in circulation, necessitating a serial number space sufficient to represent each one individually.

The case of token networks may be considered more complex than the case of hard paper currency numbering, since token networks typically provide for the possibility of dividing a larger denomination token into smaller denomination tokens. In this example, a token system is assumed in which there is an ordered set of defined denominations ranging from a largest denomination token to a smallest denomination token. In some examples, the ordered set may be structured to have each token be an integer multiple of its nearest smallest neighbour, e.g. a 2" pattern with denominations of 1, 2, 4, 8, 16, etc. In some examples, the ordered set may have some non-integer multiples, such as in the case of 1:2:5 pattern currencies, like USD, GBP, AUD, CAD, etc., where the ordered set may include $1, $2, $5, $10, $20, about 34 bits. Accordingly, the resultant storage requirement for each denomination of AUD is:

$$\frac{34 \text{ bits} \times V_{Root}(denm)}{(8 \times 1024^3)}.$$

Serialization of the GBP banknotes would require serial numbers of about 34-bits and serialization of the USD banknotes would require serial numbers of about 41-bits. Using those bit-spaces and the storage requirement expression, we can determine the storage requirements for serialized banknotes given the circulation numbers given in the table above.

| Static storage requirements for serialized banknotes (GB) | | | | | | | | |
|---|---|---|---|---|---|---|---|---|
| Currency | 1 | 2 | 5 | 10 | 20 | 50 | 100 | Total |
| AUD ($) | — | — | 0.8 | 1.06 | 2.64 | 30.24 | 28.58 | 63.32 |
| GBP (£) | — | — | 1.57 | 8.33 | 31.76 | 13.62 | — | 55.27 |
| USD ($) | 60.62 | 12.41 | 76.37 | 100.23 | 906.88 | 429.57 | 6,777.70 | 8,363.78 |

$50, etc. Leaving aside the currency example, the denominations for tokenized data storage space may be in quantities of 256 bytes, 1024 bytes, 4096 bytes, 65,536 bytes, etc. Or as another example, agricultural products may be denominated, in imperial measures, by a pint, quart, gallon, peck and bushel.

To allow for the possibility of division of tokens into smaller denominations, the bit-space for serializing tokens should accommodate the possibility of such divisions. In many token systems, the serialization of tokens may use a bottom-up approach that starts with a smallest denomination. As a non-tokenized example, Bitcoin defines the smallest denomination as a satoshi, and transactions are carried out to transfer a specified number of satoshis (note however that Bitcoin does not natively tokenize individual satoshis by assigning them each a unique serial number). If the case of fiat currencies, like AUD, the smallest banknote may be $5 for example. All other banknotes are an integer multiple of the smallest banknote. The number of certain fiat banknotes in circulation (circa 2019) broken down by denomination is:

It may be possible to serialize tokens in a manner that improves upon the storage requirements associated with a bottom-up serialization of an ordered set of token denominations. In accordance with one aspect of the present application, the serialization may employ a top-down approach, whereby the basic token issued is a largest denomination token. In such a system, the storage requirements are dynamic and can change based on subdivision of the token. The length of the serial number is dynamic and may be longer for smaller denominations to represent division of those smaller denomination tokens from a larger denomination token.

In the present application, each largest denomination token is assigned a unique root identifier. A denomination field is added to the root identifier to specify which of the ordered set of denominations applies to the token. If the denomination specified is a non-root denomination, then the token serial number includes one or more leaf identifiers. Each leaf provides sufficient bit-space to uniquely identify the token. The length of each leaf identifier may depend on the number of "children" into which the token is divisible at that level.

Figure 2:
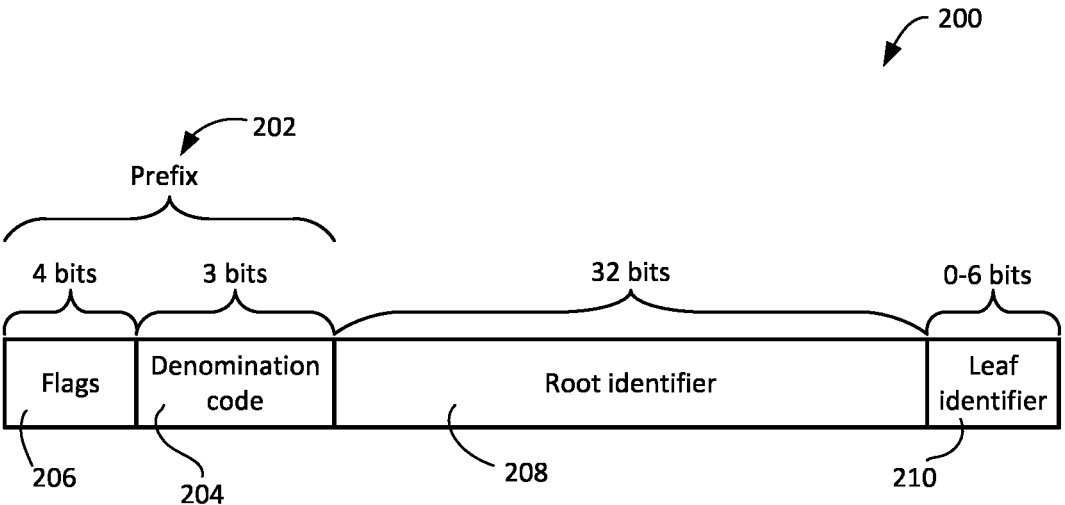
FIG. 2 shows an example data structure for a token serial number constructed in accordance with one aspect of the present application.

FIG. 2 shows an example data structure 200 for a token serial number constructed in accordance with one aspect of

| Volume of banknotes in circulation (millions) | | | | | | | | |
|---|---|---|---|---|---|---|---|---|
| Currency | 1 | 2 | 5 | 10 | 20 | 50 | 100 | Total |
| AUD ($) | — | — | 201 | 134 | 167 | 764 | 361 | 1,627 |
| GBP (£) | — | — | 396 | 1,052 | 2,006 | 344 | — | 3,799 |
| USD ($) | 12,700 | 1,300 | 3,200 | 2,100 | 9,500 | 1,800 | 14,200 | 44,900 |

The dollar value of AUD in circulation is just under $80 billion. If each AUD note larger than $5 is represented as an equivalent number of $5 notes, then the volume of notes in circulation, expressed using the root denomination of $5, is 16 billion. This is 10 times the number of actual AUD paper notes in circulation.

The bit space required to serialize a volume V of tokenized notes based on a smallest denomination is $\log_2(V)+1$. For ~16 billion $5 notes, that necessitates a serial number of the present application. In this example, the serial number includes a prefix portion 202 that includes a denomination code 204 and one or more flags 206. The flags 206 may signal metadata regarding the token or the token scheme. For example, if the tokens relate to tokenization of currency, the flags 206 may signal to which currency the token relates, i.e. a currency code. If the tokens relate to agricultural products, the flags 206 may signal a product type or class and/or a place of origin. In this example, the field is set to a length of four bits, but other sizes may be used in other embodiments depending on what data is being signalled with the flags 206. The size of the denomination code 204 field is dependent upon the number of denominations in the ordered set of denominations. In the case of a currency with denominations of $50, $20, $10, $5, $2, $1, a three-bit field is sufficient to signal the denomination code 204.

The serial number then includes a root identifier 208 field and a leaf identifier 210 field. The root identifier 208 field is of a sufficient length to tokenize the full range of largest denomination tokens to represent all issued tokens. The leaf identifier 210 field is of variable size. In the case of a root denomination, there may be no leaf identifier 210. In some cases, the root denomination may include a single bit leaf identifier 210 that defaults to 0, to leave open the possibility of signalling issuer-generated versus user-generated serial numbers, in some cases, as will be described further later.

To continue to illustrate using banknote fiat currencies as examples, assume that the 50 banknote ($ or £) is designated as the largest denomination. Using the AUD numbers for this illustration, the volume of $50 banknotes represented by the various notes in circulation are:

$$V_{\$50}(100) = V(\$100) \times 2 = 722 \text{ million}$$

$$V_{\$50}(50) = V(\$50) \times 1 = 746 \text{ million}$$

$$V_{\$50}(20) = V(\$20)/2 = 83.5 \text{ million}$$

$$V_{\$50}(10) = V(\$10)/5 - V(\$20)/\$10 = 10.1 \text{ million}$$

$$V_{\$50}(5) = V(\$5)/10 = 20.1 \text{ million}$$

In the expressions above, the 83.5 million $50 notes are capable of representing the 176 million volume of $20 banknotes plus 83.5 million $10 notes, since each $50 consumes two $20 notes and one $10 note. Likewise, although there are 134 million $10 notes in circulation, 83.5 million of them are already represented by the $50 notes accounted for in connection with the $20 banknotes. Accordingly, only (134-83.5)/5=10.1 million $50 notes are needed to represent the remaining 50.5 million $10 notes. Thus to represent all banknotes in terms of $50 tokens, about 1.6 billion such tokens would be needed.

To serialize 1.6 billion tokens, we need a bit-space of about 31-bits. In a similar manner, we can determine the token space for serializing GBP as about 31-bits and USD as about 36-bits. The serialized AUD tokens thus have a minimum bits space of about 31-bits for the root identifier 208 (root ID) and a variable length leaf identifier 210 that ranges from zero bits to 5 bits if we assume $50 AUD is represented using the root ID plus 1 bit and $5 AUD is represented using the root ID plus 5 bits.

Ignoring the prefix 202 for the time being, if we assume a 31-bit root identifier 208 for the highest denomination ($50 in this example), and we assume about 1.6 billion lots of that highest denomination (about $80 billion total currency), then the minimum storage requirement for tracking all the tokens is:

$$\frac{31 \text{ bits} \times (1.6 \times 10^9)}{(8 \times 1024^3)} = 5.77 \text{ GB.}$$

The maximum storage requirement if we assume all $80 billion is represented using $5 tokens is:

$$\frac{35 \text{ bits} \times (16 \times 10^9)}{(8 \times 1024^3)} = 65.2 \text{ GB.}$$

Accordingly, the storage requirement for representing the full token space will range from an optimum of 5.77 GB for all $50 tokens to a worst case of 65.2 GB for all $5 tokens, which compares favourably to the static case of a fixed storage requirement of 63.32 GB for AUD tokens.

We can also determine the maximum storage requirement if we assume that all $80 billion is represented using a $1 token as:

$$\frac{37 \text{ bits} \times (80 \times 10^9)}{(8 \times 1024^3)} = 344.59 \text{ GB.}$$

If we look at the actual volumes of AUD notes in circulation for guidance on likely distribution of notes, then approximately 7.35 GB would be required to represent current AUD cash volumes. Accordingly, it may be advantageous to design a tokenization system that starts with a largest denomination, rather than a smallest denomination. Moreover, as will be described below, it may be easier in a tokenized system to consolidate smaller denominations into larger ones, thereby biasing the overall system towards larger denominations and smaller storage requirements.

The most efficient and straightforward serialization scheme would employ powers of 2 in designating denominations; however, to illustrate a possible variation that results in remainders from division, an example is provided below based on a 5-2-1 series of denominations (e.g. 1, 2, 5, 10, 20, 50).

For each child denomination, a flag or bit(s) encode the integer number of children into which the parent can be divided, so as to uniquely identify each child. In a $2^n$ series, this is straightforward; however, in a 5-2-1 series this may result in remainders where a "5" is divided into 2 "2" children tokens, since a "1" token also must be produced. In principal there may only ever be a single remainder token from a division. Accordingly, the first available leaf ID of the next denomination may be used to signal this remainder. Whether or not a grandchild token results from a remainder division of a parent token is thus inherently indicated by the serial number.

To illustrate by example, and using the data structure illustrated in FIG. 2, the flags 206 field in this example may be set to 4 bits. For illustrative purposes, the flags 206 may be for designating a fiat currency in this example, such as AUD, which we will assign the flags 206 "0001".

The denomination code 204 may be used to signal the denomination of the currency, which in this example includes denominations of 50, 20, 10, 5, 2, and 1. These may represented using a 3 bit flag such as:

$50→000
$20→001
$10→010
$5→011
$2→100
$1→101

For simplicity in this example, we will assume a root identifier 208 of only 4 bits rather than a more realistic 30-36 bits. The root identifier 208 represents a $50 denomination as originally generated by an issuer node.

It will be appreciated that the $50 denomination token can be divided into a maximum of two $20 tokens, five $10 tokens, ten $5 tokens, twenty $2 tokens, or fifty $1 tokens. For each derived child denomination, at least 1 bit is needed to uniquely distinguish between the maximum of 2 children derivable from each parent. In some cases another bit is need to distinguish between derived children from a parent and a child produced as a remainder from dividing a grandparent.

To illustrate by example, assume a $50 denomination (denomination code 000) with a root ID of "0111". The serial number possibilities for various tokens produce through division of the original $50 denomination token are:

TABLE 1

| FLAG | DENOM. | ROOT | LEAF | TOKEN |
|------|--------|------|------|-------|
| 0001 | 000 | 0111 | 0 | $50 |
| | 001 | | 00, 01 | $20 |
| | 010 | | 000, 001, 010, 011, 100 | $10 |
| | 011 | | 0000, 0001, 0010, 0011, 0100, 0101, 0110, 0111, 1000, 1001 | $ 5 |
| | 100 | | 00000, 00001, 00010, 00011, 00100, 00101, 00110, 00111, 01000, 01001, 01010, 01011, 01100, 01101, 01110, 01111, 10000, 10001, 10010, 10011 | $ 2 |
| | 101 | | 000000, 000001, 000010, 000011, . . . , 100100, 100101, 100110, 100111, 101000, 101001, 101010, 101011, 101100, 101101, 101110, 101111, 110000, 110001 | $ 1 |

The $50 token has a fixed leaf ID of 0. In some cases, this leaf ID may be omitted when serializing the $50 token; however, it can be useful for some purposes. In the case of division from $50 to $20, it will be noted that the leaf IDs 00 and 01 are sufficient to distinguish between the two $20 tokens that result from the division. Moreover, when those two $20 tokens are divided into respective $10 tokens, the leaf ID space occupied by the $10 tokens is limited to 0xx, meaning the next leaf ID of 100 is available to be assigned to the $10 remainder token that results if the $50 is divided into two $20 tokens.

The assignment of remainder leaf ID becomes more complex at lower levels because the extra identifier space resulting from the $50 default 0 leaf ID has already been used. When assigning leaf IDs to $1 remainder tokens that result from division of the $5 token into $2 tokens, the first available leaf ID is "101000". Thus the remainder tokens at the $1 level span the ID space from 101000 to 110001.

Figure 3:
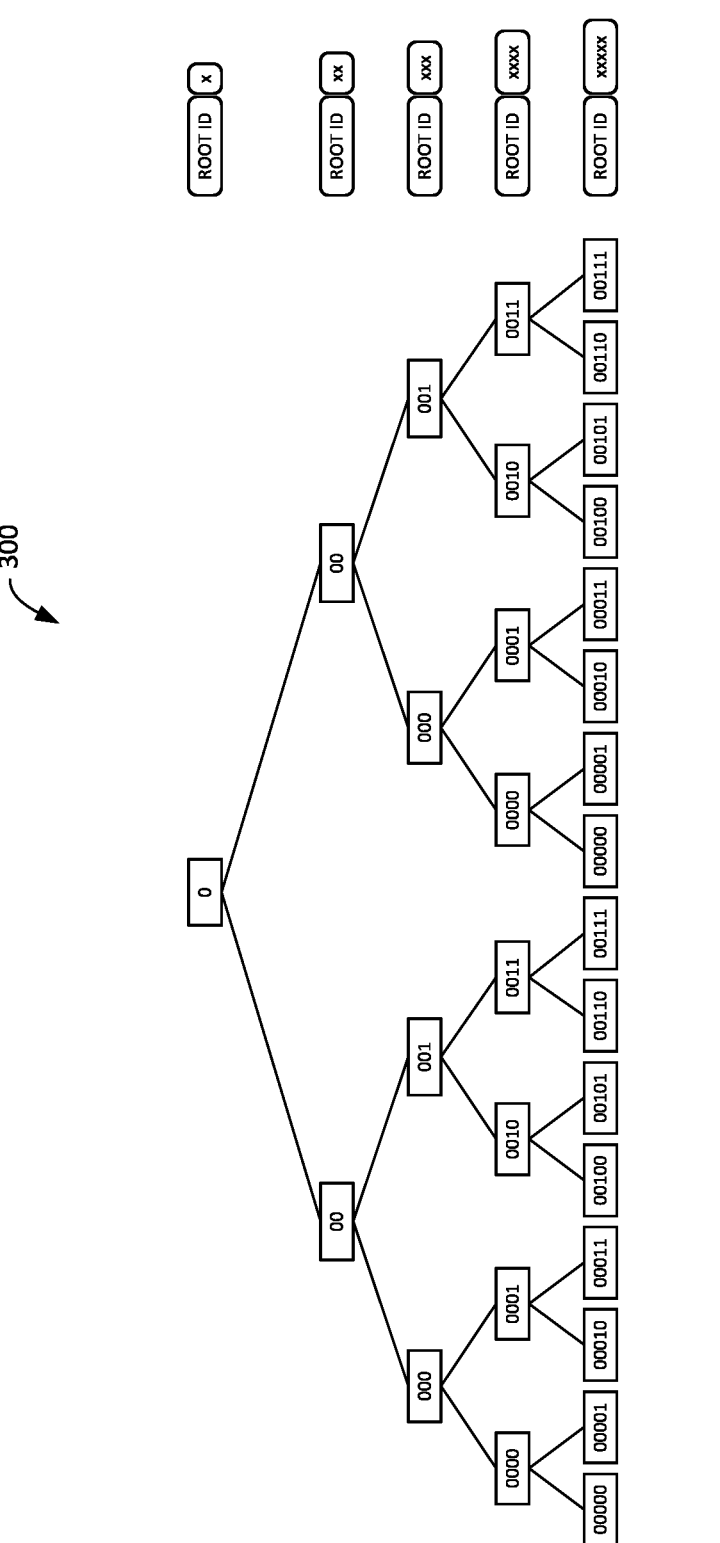
FIG. 3 shows an example of a root denomination tree for a 2" series of denominations.

The division of a root token into smaller denominations may be illustrated by a root denomination tree 300, such as is shown in FIG. 3 for an example in which the denominations form a 2″ series. In this simple example, each token is divided into exactly two children tokens, thereby making signalling each unique token straightforward using binary flags, as illustrated. It will be noted that at each successive level in the tree, the leaf identifier is extended by adding a bit. The bit signals either the left hand child or the right hand child.

Figure 4:
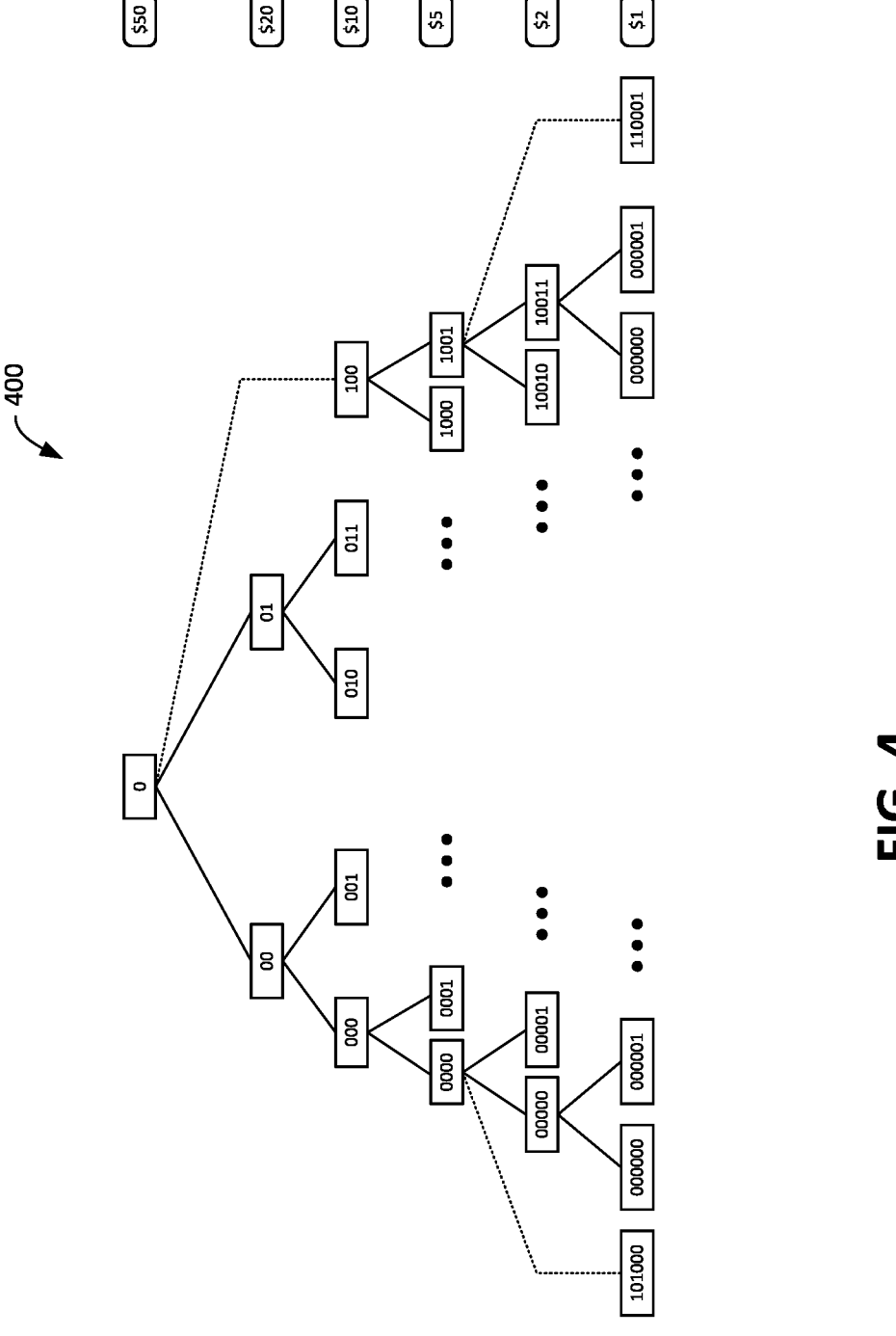
FIG. 4 shows an example of a root denomination tree for a 5-2-1 series of denominations.

The more complex serialization of a 5-2-1 series of denominations is illustrated in FIG. 4, which shows another example root denomination tree 400. Again, it will be noted that at each successive level, the leaf identifier is an extended leaf identifier as compared to the parent. When it comes to direct child nodes, the extended leaf identifier of a child node is based on the parent but may have an extra bit to signal the left hand child or the right hand child; however, the extended leaf identifier of a remainder node is not necessarily obtained by simply extending the parent's leaf identifier.

As can be seen in FIG. 3, the root denomination tree 300 for a 2″ series of denominations results in a symmetrical tree, with each parent having two child nodes and the leaf identifiers reflecting that symmetrical binary division.

In FIG. 4, it will be noted that that the root denomination tree 400 includes distinct derivation paths for remainder tokens. The remainder tokens are allocated the first available leaf identifier from the grandchild level. In the example case of a $1 token, the remainder tokens at that level have leaf identifiers that start at 101000 (40) and range to 110001 (49), since the $1 tokens derived from splitting $2 tokens take up the range from 000000 (0) to 100111 (39). The remainder nodes have leaf identifiers that are prefaced by a "1". It will also be noted that denominations that are obtained through splitting of a remainder token have a leaf identifier that is prefaced with a "1" rather than a "0".

Only one node along a branch of one of the root denomination trees 300 and 400 may be active at any one time. For instance, if the $10 token associated with leaf identifier "001" is active, then it parent nodes ($20 token "00" and $50 token "0") cannot be active. Likewise, its children $10 nodes "0010" and "0011" cannot be active since that would indicate that the $20 token had been split. However, the $20 token "000" sharing the same parent may be active, or any of its child or grandchild nodes may be active.

The token database for storing active tokens may be structured in a number of way. In one implementation, the database lists full serial numbers for all active tokens. In another implementation, the database is structure to list serial numbers in part, such as by storing the flags and root ID and within that datastructure then storing any active denomination codes and for each active denomination code any leaf identifier or identifiers active for that denomination code.

The issuer node may manage the token database and may add newly issued serial numbers or remove deactivated serial numbers, such as where a token is split or is consolidated. The splitting or consolidation of serialized tokens is discussed further below. The issuer node may maintain the token database and verify the validity of changes before making updates, such as to confirm that only one node on a path from root to leaf is active at any one time. The issued node may further provide a search or query interface through which third parties or nodes may query whether a certain serial number is active, or may seek identification of inactive or available leaf identifiers or root IDs.

In some cases, the token database stores token data in addition to the token serial number. In some cases, the token database only stores token serial numbers. In some implementations, the database may contain a field or flag indicating whether a token or serial number is "active" or "inactive". In some implementations, the database may only store active serial numbers or tokens, such that any token or serial number in the database is implicitly "active" by virtue of being in the database, and deactivation of a token or serial number is effected through removal of that token or serial number from the database.

In some cases, the token issuer may play a role in validating or authenticating whether a serial number corresponds to an active token or not in the context of a transaction. That is, authentication from the token issuer may be a condition of execution of a token transaction in some implementations. If the tokens are used on a blockchain network for example, the token issuer may have a role to play in validation of transactions involving serialized tokens in some implementations. The issuer node may be a signatory to transactions in some cases.

Figure 5:
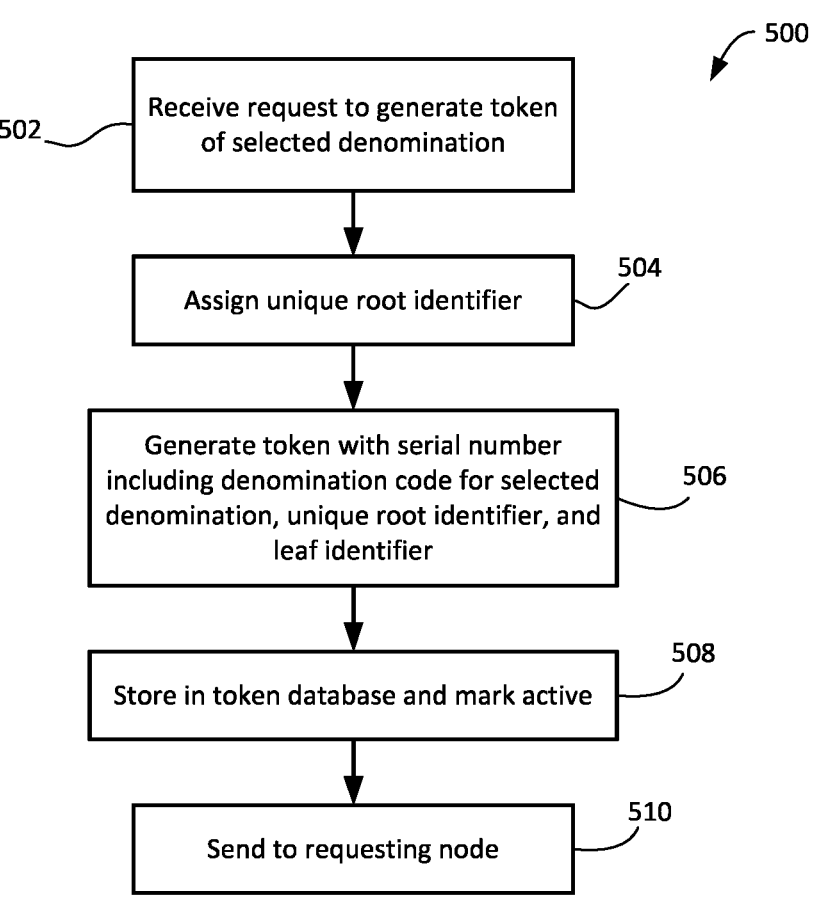
FIG. 5 shows, in flowchart form, an example method for generating serialized tokens.

Reference is now made to FIG. 5 which shows, in flowchart form, an example method 500 for generating serialized tokens. The method 500 may be implemented by an issuer node. The issuer node may include one or more computing devices having one or more processors and memory storing processor-executable instructions that, when executed by the one or more processors cause the computing devices to carry out the described operations.

The method 500 may being with receipt of a request to generate a token of a specified denomination in operation 502. The request may be associated with a requesting node. The request may be received from an issuer administrator device for example, or from an administrator interface, and may reflect token generation at the instance of the issuer. In some cases, the request may be received from an external device, such as a user device, and may be part of a request to tokenize an element. The element may be currency, a quantity of some product, or other fungible items.

In operation 504, the issuer node assigns a unique root ID. The selection of a root ID may be random in some cases. Using a hash function or other randomizing function, the issuer node may generate the root ID and quickly confirm that is it does not collide with any other root IDs in the database. In some embodiments, the root ID may be non-random and may be generated by incrementing the last root ID generated by 1.

The issuer node then generates the requested token, including its serial number in operation 506. The token itself may have other features or data in its data structure in addition to the serial number. The focus of the present application is on the serial number generation and management, so the other details of the token are not described in further detail. The serial number is generated by concatenating any prefix field with the root ID and leaf identifiers, if any. The leaf identifier may be a fixed or default leaf identifier in the case of the largest denomination or there may be no leaf identifier for the largest denomination.

If the requested denomination is a denomination other than the largest denomination, then the issuer node may generate a quantity of tokens of the requested denomination that sum to the largest denomination. Only one of those tokens may be intended for the requesting node and the remaining tokens may be stored at the issuer node. In some cases, storing the tokens includes storing them in a token storage or database. In some cases, the remaining tokens are marked inactive or unissued in the token database. The token or tokens intended for the requesting node are stored in the token database and marked active 508. In some cases, marking a token active is implicit in the storage of that token's serial number in the database.

The token or tokens generated for the requesting node are sent to the requesting node in operation 510 in reply to the request.

Figure 6:
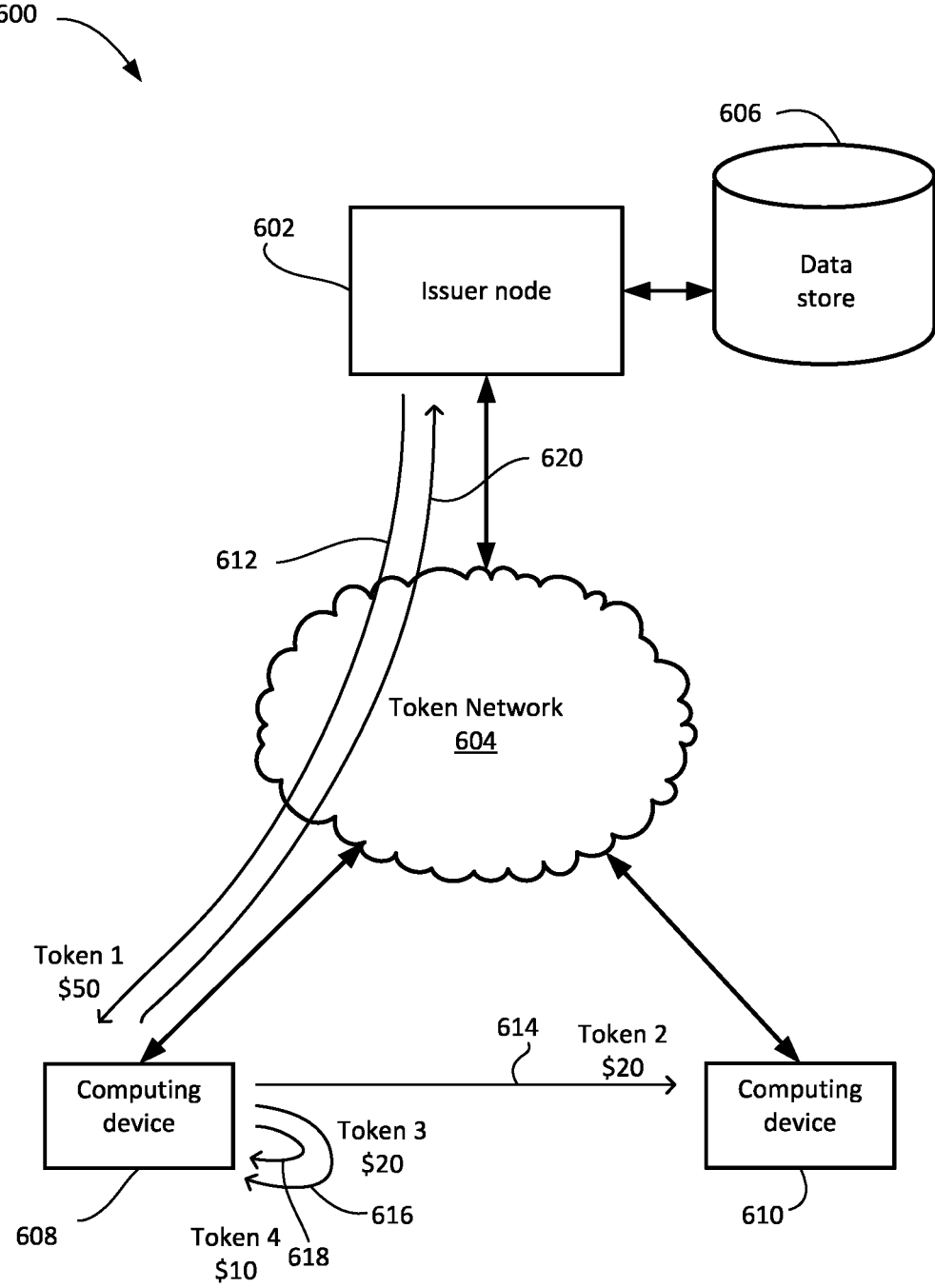
FIG. 6 diagrammatically illustrates an example token system and token transfer.

Reference is now made to FIG. 6 where an example token system 600 is illustrated diagrammatically. The example system includes an issuer node 602 that communicates with a first node 608 via a token network 604. The token network 604 may be one or more computing networks, whether wired or wireless or both, and may include private and public computing networks, such as the Internet. The token network 604 may be implemented as a token system communication protocol operating atop a packet-based network. The first node 608 may be implemented by a network-capable computing device, such as a personal computer, laptop, smartphone, tablet, or other mobile computing device. The computing device may include a token application or module for managing the storage of token data and conducting transactions with respect to tokens and exchanging communications with the issuer node 602 over the token network 604.

The issuer node 602 may include, or have access to and maintain, a token database 606. The token database 606 tracks the serial numbers of issued and active tokens. The issuer node 602 maintains the database 606 and may determine whether a token serial number is active in response to a query, may update a token serial number to make it inactive in the database 606 in response to a deactivation notification, or may store a new active serial number in the database 606.

The token system 600 may further include a second node 610. The second node 610 may also be implemented as a network-capable computing device, such as a personal computer, laptop, smartphone, tablet, or other mobile computing device.

As illustrated in FIG. 6, the issuer node 602 may provide the first node 608 with a token as indicated by numeral 612. The token may be of the largest denomination in this example, which is $50. Meanwhile, the issue node 602 may update the token database 606 to indicate that the distributed token is active.

Note that the issuer node 602 in this example is not necessarily involved in tracking or recording ownership of tokens. The token database 606 may only indicate which tokens are active, and not the identity of any owner or holder of the tokens. Data regarding ownership or possession may be managed by another system, such as a blockchain system or another such system or ledger for tracking ownership and facilitating transactions.

The first node 608 may enter into a prospective transaction with the second node 610 in which the first node 608 is to transfer a $20 token to the second node 610. If the first node 608 does not have a token with a $20 denomination, then the first node 608 may need to break a larger token into smaller tokens. In some token systems, this may necessitate involvement of the token issuer to receive the larger token and issue a set of smaller tokens; or may necessitate involvement of the token issuer in the transaction process. Such a system may have drawbacks in delay and complexity, in addition to the loss of privacy and potential for security issues.

In accordance with one aspect of the present application, the first node 608 may be capable of splitting the larger denomination token into smaller denomination tokens with valid serial numbers without requiring that the issuer node 602 effect the splitting. In particular, the first node 608 may split the $50 token into two $20 tokens and one $10 remainder token by generating tokens having serial numbers derived from the serial number of the $50 token. The derived serial numbers are generated by having the same root ID and updating the denomination code to $20 or $10, as the case may be, and appending the appropriate leaf identifier. One of the $20 denomination tokens may then be transferred to the second node 610 as indicated by numeral 614. The remaining $20 token and $10 token are retained and stored by the first node 608, as indicated by numerals 616 and 618.

In order to track the status of tokens in circulation, the issuer node 602 needs to be notified of splits in tokens.

In this example, the first node 608 may transmit a notification to the issuer node 602 regarding the splitting operation. In some implementations, the notification may specify the serial number of the $50 token and may specify into which denominations the $50 token was split. The issuer node 602 may validate that the $50 token was active and that the split properly reflects splitting of the denomination to the appropriate number of children or grandchildren tokens. It may then update the token database 606 by storing the active status of the generated children or grandchildren tokens, and deactivating the parent $50 token. In some cases, deactivating the $50 token means deleting its serial number from the database 606 in favour of storing the serial numbers of the newly-generated child or grandchild tokens. In some cases, deactivating includes updating the database 606 by changing the denomination codes and leaf identifiers stored in association with the root ID, dependent upon the data structure of the database 606.

The notification from the first node 608 may include the serial numbers of the new tokens in some cases. In some cases, it may not include the new serial numbers, and the serial numbers may be determined by the issuer node 602 on the basis of the parent token serial number and the specified denominations into which it was split.

In another embodiment, the issuer node 602 may receive notification of the split from the second node 610. The notification from the second node 610 may be instead of or in addition to the notification from the first node 608. The second node 610 may provide the serial number of the $20 token received from the first node 608, and from that serial number the issuer node 602 may determine that the active $50 node recorded in the database 606 has been split into two $20 tokens and one $10 tokens. It may then update active token information in the database 606.

In some implementations, the second node 610 may seek authentication of the validity of the $20 token from the issuer node 602. The authentication query may be a part of the transaction process between the first node 608 and the second node 610 or may be separate from that process. In response to the query from the second node 610, the issuer node 602 may consult the database 606 to determine if the provided serial number is active. If the first node 608 has not provided notification of the split prior to receipt of the authentication request, the issuer node 602 may respond with an indication that the serial number is invalid. Accordingly, the first node 608 may be configured to transmit notification of the split to the issuer node 602 prior to transferring the $20 token to the second node 610 so as to ensure that it passes any validity or authenticity checks.

Reference will now be made to FIG. 7, which shows, in flowchart form, one example method 700 of splitting a serialized token. The method 700 may be implemented in this example at a node of the token network, such as the first node 608 (FIG. 6). The node includes a network-connected computing device having a processor and suitable program instructions that, when executed by the processor, cause the computing device to carry out the described operations. In some examples, the program instructions may be embodied in a dedicated wallet application or program stored on the computing device for managing serialized tokens and building and executing transactions with other nodes involving serialized tokens. In some cases, the wallet application may be a cryptocurrency wallet.

In operation 702, the node receives instructions to send a selected token quantity to a recipient node. The selected token quantity may be larger or smaller than the largest denomination defined for the serialized token. The instruction may be received via a user interface associated with the wallet application, or may be received as a command message from another application or API.

In operation 704, the node may determine whether it has stored thereon the selected token quantity in "exact" denomination. That is, if the specified selected token quantity is a specific denomination, such as $20, and the node has stored thereon a $20 token, then in operation 706 it prepares and sends a transaction to transfer that token to the recipient node. The transaction has whatever format and structure is specified by the protocol being used to effect transactions in tokens. In some cases, the protocol is cryptocurrency protocol, such as Bitcoin; although other token transfer protocols may be used in other implementations.

If the selected token quantity is not available in "exact" form, then in operation 708 the node assesses whether it may sum two or more available tokens to arrive at the selected token quantity. For instance, if the selected token quantity is $30, then the node may assess whether it has available tokens in the denominations of $20, $10 and/or $5 that would sum to equate to $30. As another example, if the selected token quantity larger than the largest denomination, such as $175, then the node may assess whether it has available tokens in the denominations of $50, $20, $10, and/or $5 that would sum to the selected token quantity. If so, then in operation 710, the node prepares and sends a transaction to transfer those tokens. In some cases, where multiple options exist for summing tokens to arrive at the selected token quantity, the node may output the options to a user interface to enable a user to select one of the options. That is, the user may be given the choice as to which combination of denominations is used to transfer the selected token quantity.

In operation 712, if the node does not have tokens available that sum exactly to the selected token quantity, then it determines whether the available tokens sum to more than the selected token quantity; that is, whether it has more tokens than is specified by the selected token quantity. If not, then the node has insufficient tokens to fulfil the transfer instruction and it may output an error message to a user interface or by way of transmitted message in operation 714.

If the node has sufficient tokens to meet the transfer instructions, but cannot sum available tokens to match the selected token quantity, then it needs to split one of the tokens into a smaller denomination. As an example, if the selected token quantity is $20 and the node only has tokens in the $50 denomination, then it must split one of them into two $20 tokens and a $10 token. As another example, if the selected token quantity is $75 and the node has only $20 tokens, then it must split one of the $20 tokens into four $5 tokens. Accordingly, in operation 716, the node splits one of the available tokens (a "first" token) into two or more tokens of smaller denominations. It does so by generating new serial numbers for the two or more tokens of smaller denominations based on the serial number of the first token. That is, the two or more tokens of smaller denomination share the same flags and the same root id and leaf identifier, if any, from the first token. The serial numbers for the smaller denomination token have a different denomination code to reflect the different denomination, and they further have appended one or more additional leaf identifiers, based on the leaf identifiers allocated to that smaller denomination by the structure of the root denomination tree.

The splitting of the first token into smaller denomination includes determining the size of the smaller denomination desired. That is, the splitting does not necessarily produce a child node; for example, a $50 token may be split into ten $5 tokens (great-grandchildren) if the required token denomination is $5 and the available first token is of a $50 denomination.

As indicated by operation 718, the node further determines whether the splitting of the first token in two or more smaller denominations results in a remainder token of another denomination. In the case of a 5-2-1 series, the splitting of a "5" denomination into two "2" denomination necessarily produces a remainder "1" denomination. Accordingly, in this case, the node further produces a remainder token of that denomination. The serial number of the remainder token is based on the serial number of the first token. That is, it includes the flags and root id of the first token; however, it does not necessarily include any part of the leaf identifier of the first token. Instead the remainder token receives a leaf identifier(s) that is allocated to remainder tokens of that denomination in that branch of the root denomination tree.

For instance, with reference to FIG. 4, and Table 1, above, when a $5 token having the serial number [flags][denom] [root ID][0000] is split into two $2 tokens, the $2 tokens inherit the same basic serial number including the leaf identifier [0000], with one further leaf identifier bit appended, so as to result in: [flags][denom][root ID][00001] and [flags][denom][root ID][00001]. Conversely, the $1 remainder token from this splitting operation results in a remainder token serial number that has the same root ID, but a distinct leaf identifier: [flags][denom][root ID][101000], since that is the leaf identifier assigned to the $1 remainder token from that branch of the root denomination tree.

Once the new tokens have been generated by the splitting of the first token, and have been saved at the node, then in operation 720, the node prepares and sends a transaction to the recipient node transferring the tokens, including one or more of the new tokens, that sum to the selected token quantity. As noted above, the structure and format of the transaction and the process for effecting the transaction are governed by the applicable protocol used by the token system for transfer of tokens.

As another example, consider a case in which a node ("Alice") holds a $50 token and intends to transfer a $20 token to a recipient node ("Bob"). The transaction protocol involved may be a Bitcoin transaction. The $50 token may be represented as:

| Flag | Denm. | Root | i(20) | i(10) | i(5) | i(2) | i(1) | Comment |
|------|-------|------|-------|-------|------|------|------|---------|
| 0001 | 000 | 0111 | | | | | | $50 input from Alice. |

Here, the notation i(denm) denotes the RDT index level of a denomination. The output can either be the same token or a set of tokens divided from the input:

| Flag | Denm. | Root | i(20) | i(10) | i(5) | i(2) | i(1) | Comment |
|------|-------|------|-------|-------|------|------|------|---------|
| 0001 | 001 | 0111 | 00 | | | | | $20 paid to Bob's public key. |
| 0001 | 001 | 0111 | 01 | | | | | $20 change paid to Alice's public key. |
| 0001 | 010 | 0111 | 10 | 0 | | | | $10 change paid to Alice's public key. |

It is verifiable that the inputs match the outputs in both value and in serial number. The above exchange between Alice and Bob may be implemented by way of Bitcoin's UTXO transactional model in which $PK_i$ refers to the public key of node i.

| TxID$_{verify}$ | | | | |
|---|---|---|---|---|
| Version | 1 | Locktime | 0 |
| In-count | 1 | Out-count | 2 |

| Input list | | | |
|---|---|---|---|
| | Unlocking | | Output list |
| Outpoint | script | Value | Locking script |
| TxID$_{issue}$ ‖ 0 | <Sig$_A$> <PK$_A$> <AUD(7; 8)> | dust dust | <AUD(7:1)> OP_EQUALVERIFY OP_DUP OP_HASH160 <H(PK$_B$)> OP_EQUALVERIFY OP_CHECKSIG <AUD(8)> OP_EQUALVERIFY <AUD(7:2)> OP_EQUALVERIFY <AUD(7:0:1) > OP_EQUALVERIFY OP_DUP OP_HASH160 <H(PK$_A$)> OP_EQUALVERIFY OP_CHECKSIG |

In the above example, TxID$_{issue}$ points to the transaction in which Alice received two original $50 tokens of root ID 0111 ("7") and root ID 1000 ("8"). The notation <AUD(7; 8)> indicates that these are $50 AUD tokens having those root IDs. The <AUD (8)> token is returned to Alice's public key, whereas the <AUD (7)> token is split into two $20 tokens and a $10 token: <AUD (7:1)>, <AUD(7:2)>, and <AUD(7:0:1)>. One of the $20 tokens, <AUD(7:1)> is sent to Bob's public key (PKB) in the output.

In some implementations, a condition may be imposed within the transaction or as part of the transaction validation that the issue node validate that the root ID is valid and that either the input tokens are active or that the split output tokens are active (for example, if the sending node has already notified the issuer node of its intention to split the token). These checks may be fast and low cost to execute since the issuer node may track the status of all tokens (inactive nodes/branches in the RDT) using a lightweight token database.

In some cases, it may be advantageous to facilitate endpoint-initiated recombination or consolidation of tokens. That is, in one aspect, the present application provides a method and system for combining two or more tokens to generate a new token of a larger denomination.

For serialised tokens that are embedded in Bitcoin transactions, the process of recombination can lower transaction fees by reducing the number of UTXOs in a transaction. Incentivising nodes to recombine tokens of smaller denominations may further optimise the storage requirements of the token database by eliminating smaller denomination tokens. For example, if various users combine smaller denominations such that the issuer node determines that leaf IDs from different users that belong to a single root ID have been inactivated through recombination operations, then an inactive root ID may be available to be reinstated before having to derive new root denominations.

The recombination of child or grandchild denominations held by a single node into a parent denomination is relatively straightforward. That is, if a first node holds all the leaf nodes of a particular denomination in a root denomination tree, i.e. the tokens to be combined all share the same parent, then recombining them involves generating a token of a larger denomination having the same root ID and having the leaf identifier of the parent. The larger denomination is the sum of the smaller denomination tokens being combined. For example, a $20 token and six $5 tokens all with the same root ID may be combined into a single $50 token of the same root ID.

The node holding the tokens to be combined may effect the recombination and send a notification to the issuer node regarding the recombination. The issuer node may then update the database to reflect that the larger denomination is active and the smaller denominations are inactive. In some cases, the issuer node may perform an authentication or verification operation to validate the ownership of the tokens being combined, such as through verifying ownership recorded on a blockchain or other searchable public or private ledger for tracking ownership.

Combining serialized tokens that have different parents may be more complex. This includes tokens from different root ID, or tokens from the same root ID that have different parents. For example, two $5 tokens may have the same root ID but be derived from different $20 tokens in the same root denomination tree. In some cases, the node holding the tokens may request that the issuer node carry out the consolidation and send back a combined token. Thus, the issuer node may inactivate the tokens being combined and may select an available root ID for generating the combined token. The root ID of the combined token may be one of the root IDs of the tokens being combined, if the root denomination trees of those root IDs have an available and inactive branch of the correct denomination, or may be a different root ID.

In another case, the node holding the tokens may generate a new combined token having a deterministically derived serial number and may notify the issuer node of the new combined token. This approach may give the node greater autonomy in that the issuer node is not necessarily involved in pre-generating the combined token; although in some cases the issuer node may have a role in recording occurrence of the combination operation after the fact and resolving serial number collisions, if any.

The present application presents two example mechanisms for recombining tokens: a hashing method and a shuffling method.

The hashing method may be implemented by dividing the root ID bit-space into two segments. The first segment is the root ID space allocated to issuer-generated tokens. This root ID space may include root ID from zero to a maximum number of largest denomination tokens to be issued. Root IDs may be consumed by the issuer node when issuing tokens in a sequential manner as it generates tokens.

The second segment of the root ID bit-space may be allocated to recombination tokens. In some implementations, the segmentation may be implemented using a high bit of the root ID. That is, the 0xxx . . . xx portion of the bit-space is for issuer-generated tokens, and the 1xxx . . . xx portion of the bit-space is for recombined tokens.

One deterministic scheme for deriving a new root ID for a combination of two or more tokens is to generate the root ID as a hash of the root IDs from the tokens to be combined. The root IDs may be sorted by integer value from smallest to largest or from largest to smallest. In some implementations, then combination may be hashed. In some implementations, them may be hashed in sequence and a modulo taken to limit the bit-space.

If the recombined token root ID bit-space requires that the high bit be set to "1", then the recombined root ID derived from hashing may be assessed to see if its high bit is set and, if not, it is rehashed until a recombined root ID is obtained with the high bit set.

In some cases, combination may be recorded in a transaction record, such as in a Bitcoin transactions if the token system employs the Bitcoin network. The tokens to be combined form part of the input signed by the nodes public key, and the combined token is the output and is transferred to the node's public key.

It will be appreciated that the hashing method may necessitate consideration of the size of the bit-space for the root ID, since hash collisions are possible. In some cases, to reduce collisions, the bit-space may be enlarged as the expense of storage cost. In another implementation, an alternative larger root ID space may be designated for recombined coins. For example, if a high bit set to one signals a root ID, then the length of the root ID could be longer for a recombined token than for an issuer-generated token. This may incentivize nodes to return tokens to an issuer for generation of a combined token by the issuer rather than generation of the combined token by the node itself. In another implementation, the token database may be exposed to the token network, and nodes may be able to query the token database to detect collision. Accordingly, once the node generates a recombined ID using the hashing method, it may then validate using a query of the token database that the recombined ID is available before using it. In some cases, a bloom filter or other fast search mechanism may be used to assess whether a recombined ID is available or not.

An alternative to the hashing method is a shuffling method. This method relies on the fact that there are unused leaf identifiers in each root denomination tree. In the example of a 2" tree, such as is illustrated in FIG. 3, because the first leaf for the largest denomination defaults to "0", there is an unused mirror image of the tree on the right hand side for the first leaf set to "1". The leaf identifiers that begin with "1" are unused and available to signal "recombined" tokens. This is similar in principle to the expansion of the root ID space through using the high bit to signal a recombined root ID in the hashing example; except here the node uses the available leaf identifier space on the right-hand side of the root determination tree to signal that a token is a recombined token.

In the more complex example of a 5-2-1 series, as illustrated in FIG. 4, there are a set of leaf identifiers that being with "1" that are unused on the right hand side of the tree. Note, however, that in this case there are a certain number of those leaf identifiers that are already allocated to possibly represent "remainder" tokens and are thus considered part of the left hand side of the tree.

When a node combines two or smaller denominations to form a larger denomination, those two or more smaller denominations each have a respective root ID. Starting with one of the root IDs, the node then begins a search through recombination leaf identifiers at the level of the larger denomination from the right hand side of that tree to identify an available unused recombination leaf identifier at that larger denomination. This may be termed a "shuffle" as the node shuffles through the larger denomination right-hand side leaf identifiers to locate one that is available. If none are available in the right hand side of the root denomination tree for a first one of the root IDs, then the node moves on to another of the root IDs for the tokens being combined.

The search for available leaf identifiers may include the node querying the token database for whether those serial numbers are active or inactive. For example, where the token database maintains a list of all active serial numbers, the query may be a bloom filter based search of the database to see if it contains the prospective right hand side leaf identifier in combination with the root ID as one of the serial numbers. If so, then the node moves on to test the next one of the right hand side leaf identifiers. In this manner the node searches the token database for an available leaf identifier at the level of the larger denomination. Once it finds one, it generates the larger denomination token having the corresponding serial number with the available leaf identifier, and it notifies the issuer node regarding the recombination operation.

It will be appreciated that once the issue node is notified of the combination, the issuer node updates the database to indicate that the larger denomination within the right hand side of the root denomination tree is now active, and that the smaller denominations on the left hand side are now inactive. This makes a branch or portion of a branch on the left hand side inactive. Accordingly, a part of the left hand side of the root denomination tree now has leaf identifiers available for recombination operations. Therefore, in some implementations, in further recombination operations, if a node cycles through right hand side leaf identifiers without finding an available right hand side leaf identifier, it may then cycle through left hand side identifiers in search of an available leaf identifier.

The deterministic property of the root denomination tree (RDT) data structure means that recombined tokens can largely be treated in the same way as the serial numbers on the left hand side, i.e., the same derivation and division rules may apply to both sides of the RDT. A caveat to this rule emerges due to the asymmetry between the number of nodes in the left hand side and right hand side. This asymmetry is a consequence of the remainder tokens in the left hand side.

This asymmetry affects the derivation of certain child denominations on the right hand side, namely those derived from a parent denomination of "20" or "2". For example, the parent "20" with leaf ID 10 on the right hand side can only derive one child denomination (leaf ID 101) because of the existence of a remainder token on the left hand side with leaf ID 100. Similarly, the first two parent "2" denominations with leaf IDs 10100, 10101 do not divide into child denominations on account of the remainder tokens on the LHS. This asymmetry may not be problematic for the token system since the database has the correct data structure for both left hand side and right hand side, and automatically updates as new tokens are correctly derived or recombined. However, the restrictive nature of some denominations of recombined tokens may result in different handling of splits or consolidations by a wallet application if dealing with a right hand side leaf identifier.

Figure 8:
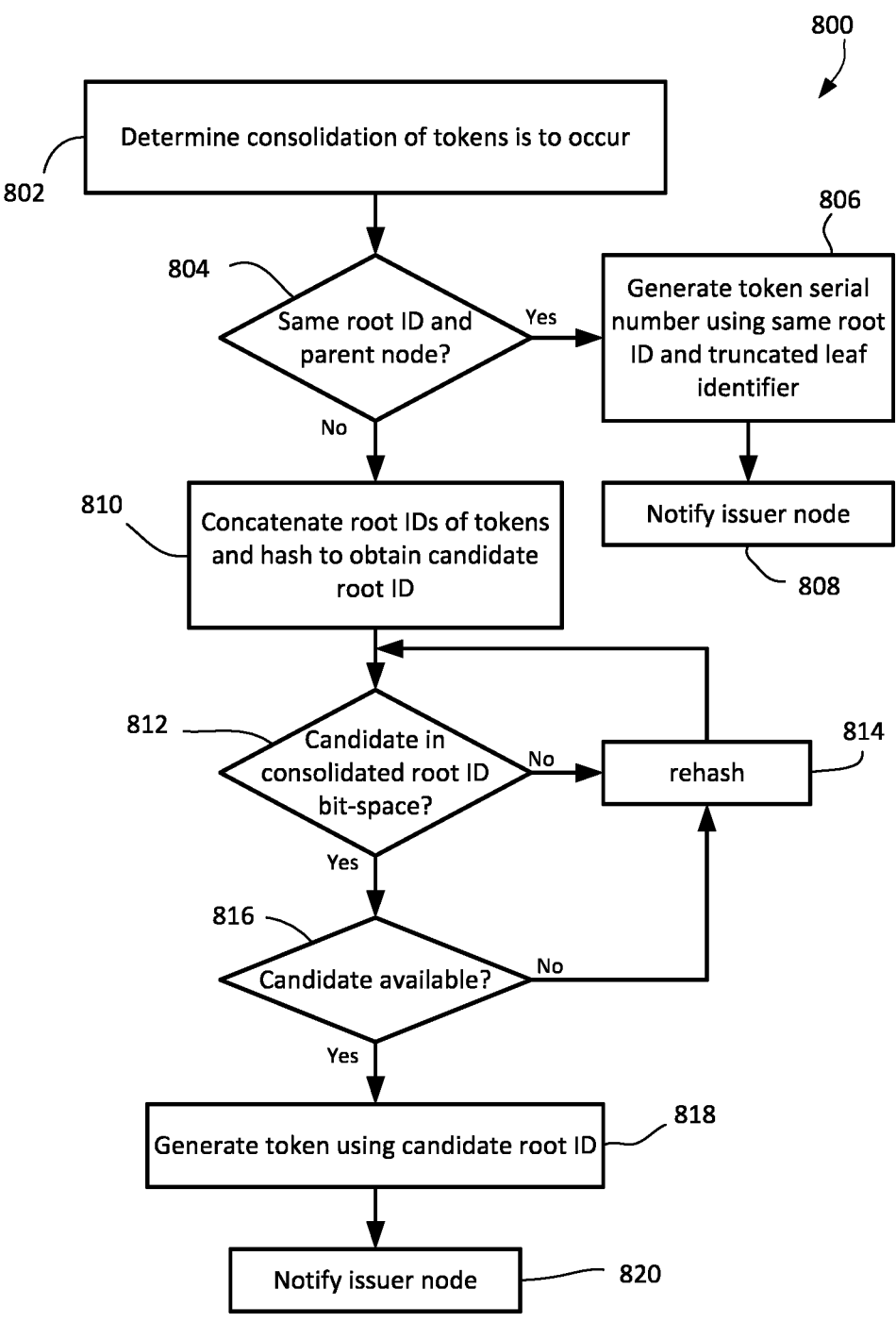
FIG. 8 shows, in flowchart form, one example method for consolidating tokens.

Reference is now made to FIG. 8, which shows, in flowchart form, one example method 800 for consolidating tokens. The method 800 may be implemented in this example at a node of the token network, such as the first node 608 (FIG. 6). The node includes a network-connected computing device having a processor and suitable program instructions that, when executed by the processor, cause the computing device to carry out the described operations. In some examples, the program instructions may be embodied in a dedicated wallet application or program stored on the computing device for managing serialized tokens and building and executing transactions with other nodes involving serialized tokens. In some cases, the wallet application may be a cryptocurrency wallet.

The method 800 may include determining that two or more tokens are to be consolidated into a single token of a larger denomination, as indicated by operation 802. The two or more tokens may be of the same smaller denomination or different smaller denominations. For example, the tokens may include two $20 tokens and two $5 tokens being consolidated into a single $50 token. In another example, the tokens may include four $5 tokens being consolidated into a single $20 token.

The determination that consolidation is to occur may be based on an instruction from a user interface or from an external system or API. That is, the node may receive a command to consolidate the tokens. In another implementation, the node may proactively identify opportunities to consolidate tokens. That is, the node may determine, based on the tokens associated with the node (e.g. stored in a local wallet), that two or more of the tokens may be combined to create a larger denomination token. The node may seek user confirmation of such a node-initiated combination in some cases; whereas in other implementations the node may automatically initiate opportunistic consolidation of tokens.

In operation 804, the node determines whether the two or more tokens share the same parent (or grandparent, etc., if being combined to form the grandparent or higher level denomination token). If so, such that the recombination result in activation of the parent (or grandparent) then in operation 806 the node generates the new larger denomination token with the serial number of the parent or grandparent as the case may be. In operation 808, the node notifies the issuer node of the consolidation so that the issue node may activate the larger denomination token in the database and deactivate the smaller tokens that were combined. The notification may be by way of message to the issuer node in some cases. The notification may be based on publishing the combination, such as through propagating a consolidation transaction on the token network, for example. The issuer node, on seeing and/or validating the consolidation transaction, may update the token database.

If the consolidation does not involve the trivial case where the tokens share the same branch of the root denomination tree, then in operation 810 the node concatenates the root IDs of the tokens being consolidated and hashes them to obtain a candidate root ID. The consolidation and hashing operation may take many forms in different implementations, but is intended to produce a deterministic randomized root ID constrained within the bit-space of the consolidated token root IDs. In one example, the consolidation involves first ordering the root IDs of the tokens. The ordering may be smallest to largest or largest to smallest. Once ordered, the concatenated root IDs are hashed using a hash function to produce a randomized number. The hash function may be selected to product a hash having the length of the bit-space for root IDs in some cases. The hash function may be larger than the bit-space and may be truncated to arrive at the candidate root ID having the correct length. In some cases, a modulo operation may be used to arrive at the candidate root ID having the correct length. In one example, the generation of a candidate root ID takes the form:

$$\text{Root } ID_{recomb} = H(\text{Root } ID0 \| \text{Root } ID1 \| \dots \| \text{Root } IDN) \bmod n$$

In the above expression, the candidate root ID is Root $ID_{recomb}$, the hash function is H(·), N is the number of tokens being consolidated, Root IDi refers to the root ID of the ith token, and n is the length of the root ID bit-space.

Once the candidate root ID is determined in operation 810, then in operation 812 the node assesses whether the candidate root ID is within the segment of the bit-space allocated for consolidated root IDs. For example, if the segmentation of the bit-space is based on consolidated root IDs having a leading "1", then the node assesses whether the candidate has a leading "1". If not, then the node may re-do the hashing operation as indicated by operation 814. This may involve re-hashing the candidate root ID (and truncating or applying a mod n operation) to generate a subsequent candidate root ID. This continues until a suitable candidate is found.

Once a candidate is found, then the node may determine whether the candidate root ID is available, i.e. whether there is collision with an existing and active root ID. This determination may be based on querying the token database. In some cases, the token database includes a query interface enabling the node to generate and send an availability query to the database and received a response indicating that the candidate is or is not available. In some cases, the query is routed through the issuer node. In some cases, copies of the token database may be mirrored elsewhere in the token network and may be searchable without directly contacting the issuer node.

If the candidate root ID is not available, then the node returns to rehash the candidate in operation 814 to find a subsequent candidate. If the candidate is available, then in operation 818 the node generates the larger denomination token having a serial number that incorporates the available candidate root ID and the issue node is notified in operation 820. The token database is then update to reflect that the smaller tokens that were consolidated are now inactive and that the larger token having the new candidate root ID is now active.

Figure 9:
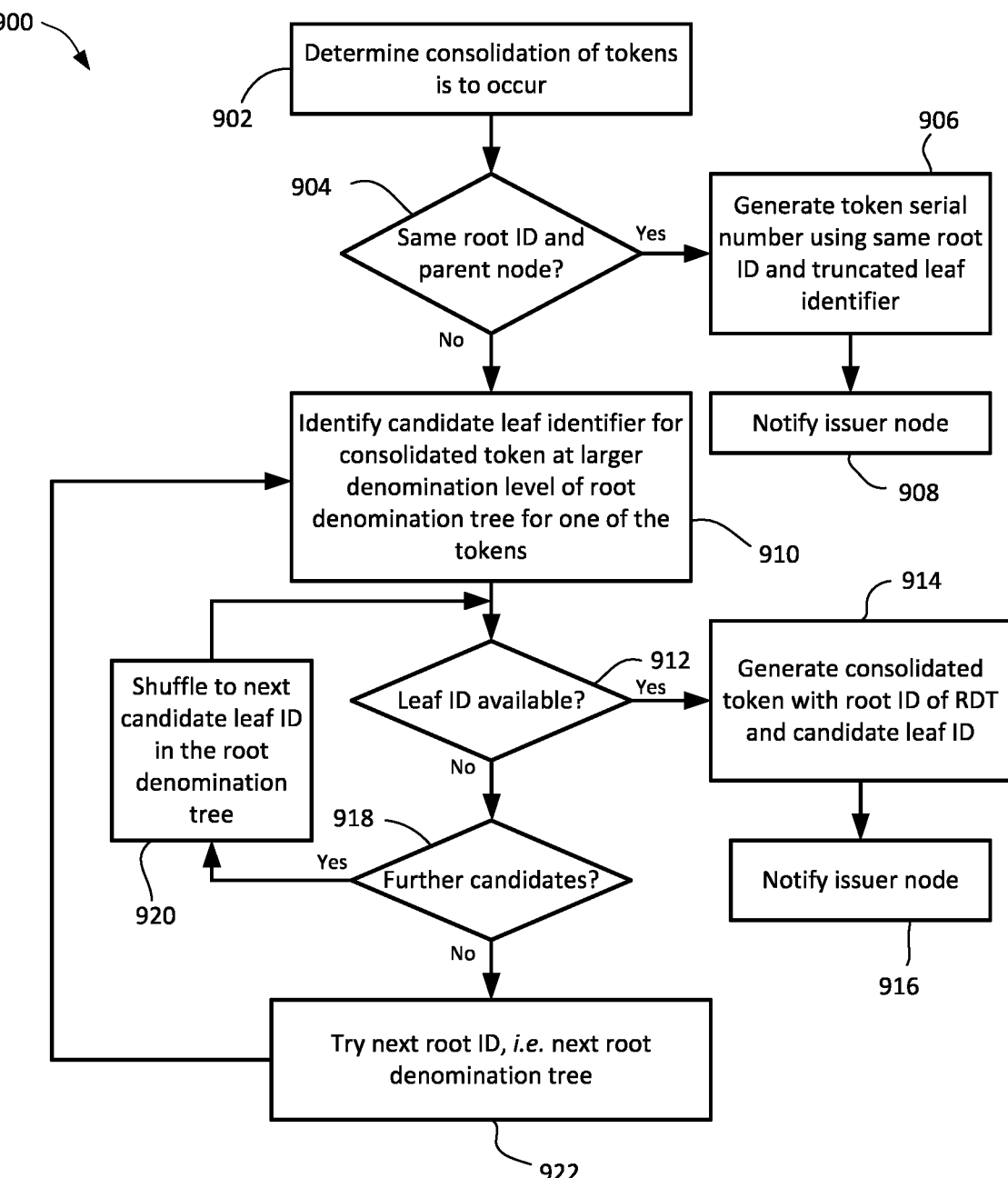
FIG. 9 shows, in flowchart form, another example method for consolidating tokens.

Another example method 900 of consolidating tokens is illustrated in flowchart form in FIG. 9. The method 900 employs the shuffling operation for identifying an available leaf identifier. The method 900 may be implemented in this example at a node of the token network, such as the first node 608 (FIG. 6). The node includes a network-connected computing device having a processor and suitable program instructions that, when executed by the processor, cause the computing device to carry out the described operations. In some examples, the program instructions may be embodied in a dedicated wallet application or program stored on the computing device for managing serialized tokens and building and executing transactions with other nodes involving serialized tokens. In some cases, the wallet application may be a cryptocurrency wallet.

The method 900 may include determining that two or more tokens are to be consolidated into a single token of a larger denomination, as indicated by operation 902. The two or more tokens may be of the same smaller denomination or different smaller denominations. AS discussed in connection with FIG. 8, the determination that consolidation is to occur may be based on an instruction from a user interface or from an external system or API. That is, the node may receive a command to consolidate the tokens. In another implementation, the node may proactively identify opportunities to consolidate tokens. That is, the node may determine, based on the tokens associated with the node (e.g. stored in a local wallet), that two or more of the tokens may be combined to create a larger denomination token. The node may seek user confirmation of such a node-initiated combination in some cases; whereas in other implementations the node may automatically initiate opportunistic consolidation of tokens.

In operation 904, the node determines whether the two or more tokens are on the same branch of the root denomination tree, i.e. they share the same parent or grandparent, etc. If so, such that the recombination result in (re)activation of the parent or grandparent, etc., then in operation 906 the node generates the new larger denomination token with the serial number of the parent or grandparent as the case may be. In operation 908, the node notifies the issuer node of the consolidation so that the issue node may activate the larger denomination token in the database and deactivate the smaller tokens that were combined. The notification may be by way of message to the issuer node in some cases. The notification may be based on publishing the combination, such as through propagating a consolidation transaction on the token network, for example. The issuer node, on seeing and/or validating the consolidation transaction, may update the token database.

If the consolidation does not involve the trivial case where the tokens share the same branch of the root denomination tree, then in operation 910 the node identifies a candidate leaf identifier within one of the root denomination trees. The root denomination tree may be selected from the root ID of the tokens being consolidated in some cases. The root IDs of the tokens may be ordered, for example from smallest to largest, and the node may begin with the first of the root IDs. The candidate leaf identifiers on the right hand side of the tree are defined by the tree structure, which is fixed for certain denomination series. For example, in the case of a 5-2-1 series, the tree is asymmetrical. The right hand side includes all leaf identifiers that begin with "1", but excludes any leaf identifiers that are assigned to remainder tokens or the children/grandchildren of those remainder tokens. For example, the $10 denomination level on the left hand side includes a leaf identifier of "100" designated for the remainder $10 that comes from splitting a $50 token into two $20 tokens. That remainder $10, if split into two $5 tokens, result in leaf identifiers of "1000" and "1001". Accordingly, at each denomination level there are certain right hand side leaf identifiers that are potential candidates as defined by the tree structure for that series.

Operation 910 may, in some implementations, involve starting with the left most (or smallest) leaf identifier belonging to the right hand side of the root denomination tree.

In operation 912 the node determines whether the candidate leaf identifier is available. This may include querying the token database to determine whether there is already a serial number having that root ID and leaf identifier. In some cases, the token database includes a query interface enabling the node to generate and send an availability query to the database and received a response indicating that the candidate is or is not available. In some cases, the query is routed through the issuer node. In some cases, copies of the token database may be mirrored elsewhere in the token network and may be searchable without directly contacting the issuer node.

If available, then in operation 914, the node generates the larger denomination token representing the consolidated tokens and assigns it a serial number formed using the root ID and the candidate leaf identifier. The issuer node is then notified of the consolidation so that is can update the token database in operation 916.

If the candidate leaf identifier is not available in operation 912, then in operation 912, the node assesses whether there are further candidates in the same root denomination tree. If so, then in operation 914, the node 'shuffles' to the next candidate. In other words, it identifies another candidate leaf identifier. In some instances the node is configured to cycle through all possible candidate leaf identifiers in the right hand side of the root denomination tree. In some instances, once the node has cycled through all candidate leaf identifiers in the right hand side of the root denomination tree, it cycles through candidate leaf identifiers in the left hand side of the root denomination tree. In some cases, a left hand leaf identifier may have become available through inactivation of its branch, for example as a result of another earlier consolidation operation in which one or more tokens on the left hand side were consolidated with one or more tokens from another root ID, leaving a portion of the left hand side of the tree inactive. This may make some leaf identifiers on the left hand side available for "re-activation", i.e. enabling their re-use for representing a consolidated token.

In the event that an available leaf identifier is not found in the first root denomination tree, then in operation 922, the node may select a next root denomination tree. The next root denomination tree may be a next one of the root IDs from among the tokens being consolidated. In some instances, if the node has exhausted all root ID form among the tokens being consolidated without identifying an available leaf identifier, then it may select a root ID at random, based on a token in its possession, or based on a list or database of root IDs suitable for consolidation operations published by the issuer node.

In one variation on the method 900 described above, instead of cyclically sending queries to the issuer node or token database regarding whether leaf identifiers are available, the node may send an availability query that includes the root ID and the denomination, and may receive in response from the issuer node an available leaf identifier. The available leaf identifier may be from the right hand side of the tree, i.e. the recombination segment of the root denomination tree, or from the left hand side if the right hand side has no leaf identifiers available at that denomination. If there is no leaf identifier available, then the issuer node may return a failure notification, in response to which the node may generate and send a further availability query with another root ID.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of consolidating tokens by a computing device in a token system, the method comprising:

receiving an instruction to consolidate two or more serialized tokens, each token having a respective serial number, each serial number containing a respective root identifier, a denomination code, and a leaf identifier allocated to that denomination code, wherein denomination codes for the two or more serialized tokens represent denominations selected from among a defined ordered set of denominations that when summed equate to a larger denomination from the defined ordered set of denominations;

determining that the two or more serialized tokens include at least two respective serial numbers having different respective root identifiers or at least two leaf identifiers having different parents;

identifying a candidate root identifier and candidate leaf identifier, wherein the candidate leaf identifier is allocated to the larger denomination;

determining that the candidate root identifier and the candidate leaf identifier, in combination, are available for use;

generating a new token having a new serial number containing the candidate root identifier, the candidate leaf identifier, and a denomination code corresponding to the larger denomination; and notifying an issuer computing device of consolidation and deactivation of the two or more serialized tokens resulting in the new token.

2. The method claimed in claim 1, wherein a bit-space for root identifiers is partitioned into a first bit-space of root identifiers associated with issued tokens and a second bit-space of root identifiers associated with consolidated tokens, and wherein identifying a candidate root identifier includes selecting the candidate root identifier from the second bit-space.

3. The method claimed in claim 2, wherein selecting includes generating the candidate root identifier using a hash function.

4. The method claimed in claim 3, wherein generating includes concatenating the respective root identifiers of the two or more serialized tokens and hashing the result.

5. The method claimed in claim 4, wherein the hashing produces a first root identifier within the first bit-space and, as a result, re-hashing the first root identifier until the candidate root identifier is produced.

6. The method claimed in claim 2, wherein determining that the candidate root identifier is available includes transmitting a message to an issuer computing device regarding the candidate root identifier and receiving a response message confirming the candidate root identifier is available.

7. The method claimed in claim 2, wherein determining that the candidate root identifier is available includes querying a token database and receiving a query result indicating that the token database does not contain the candidate root identifier.

8. The method claimed in claim 1, wherein identifying a candidate root identifier and candidate leaf identifier includes selecting one of the respective root identifiers and selecting a leaf identifier designated for consolidated tokens at the larger denomination.

9. The method claimed in claim 8, wherein selecting the leaf identifier designated for consolidated tokens at the larger denomination includes selecting a first leaf identifier, determining that the first leaf identifier is unavailable, selecting the candidate leaf identifier, and determining that the candidate leaf identifier is available.

10. The method claimed in claim 8, wherein selecting the leaf identifier includes sending a message to an issuer computing device and receiving a response indicating the candidate leaf identifier available.

11. The method claimed in claim 1, wherein each leaf identifier indicates a unique path from a root denomination in the defined ordered set of denominations to a respective node corresponding to that leaf identifier in a root denomination tree, wherein the root denomination tree maps splitting of the root denomination into successively smaller denominations in the defined ordered set of denominations.

12. The method claimed in claim 11, wherein the candidate leaf identifier is a leaf identifier not included in the root denomination tree and allocated to consolidated tokens.

13. The method claimed in claim 1, further comprising, at the issuer computing device, removing the respective serial numbers of the two or more serialized tokens from a token database and storing the new serial number for the new token in the token database.

14. A computing device for consolidating tokens by a computing device in a token system, the computing device including:

one or more processors;

memory;

computer-executable instructions stored in the memory that, when executed by the one or more processors, cause the processors to:

receive an instruction to consolidate two or more serialized tokens, each token having a respective serial number, each serial number containing a respective root identifier, a denomination code, and a leaf identifier allocated to that denomination code, wherein denomination codes for the two or more serialized tokens represent denominations selected from among a defined ordered set of denominations that when summed equate to a larger denomination from the defined ordered set of denominations;

determine that the two or more serialized tokens include at least two respective serial numbers having different respective root identifiers or at least two leaf identifiers having different parents;

identify a candidate root identifier and candidate leaf identifier, wherein the candidate leaf identifier is allocated to the larger denomination;

determine that the candidate root identifier and the candidate leaf identifier, in combination, are available for use;

generate a new token having a new serial number containing the candidate root identifier, the candidate leaf identifier, and a denomination code corresponding to the larger denomination; and notify an issuer computing device of consolidation and deactivation of the two or more serialized tokens resulting in the new token.

15. A non-transitory computer-readable medium storing processor-executable instructions for consolidating tokens by a computing device in a token system, the processor-executable instructions including instructions that, when executed by one or more processors, cause the processors to:

receive an instruction to consolidate two or more serialized tokens, each token having a respective serial number, each serial number containing a respective root identifier, a denomination code, and a leaf identifier allocated to that denomination code, wherein denomination codes for the two or more serialized tokens represent denominations selected from among a defined ordered set of denominations that when summed equate to a larger denomination from the defined ordered set of denominations;

determine that the two or more serialized tokens include at least two respective serial numbers having different respective root identifiers or at least two leaf identifiers having different parents;

identify a candidate root identifier and candidate leaf identifier, wherein the candidate leaf identifier is allocated to the larger denomination;

determine that the candidate root identifier and the candidate leaf identifier, in combination, are available for use;

generate a new token having a new serial number containing the candidate root identifier, the candidate leaf identifier, and a denomination code corresponding to the larger denomination; and notify an issuer computing device of consolidation and deactivation of the two or more serialized tokens resulting in the new token.

16. The computing device claimed in claim 14, wherein a bit-space for root identifiers is partitioned into a first bit-space of root identifiers associated with issued tokens and a second bit-space of root identifiers associated with consolidated tokens, and wherein the instructions, when executed, are to cause the processor to identify a candidate root identifier by selecting the candidate root identifier from the second bit-space.

17. The computing device claimed in claim 16, wherein selecting includes generating the candidate root identifier using a hash function.

18. The computing device claimed in claim 17, wherein generating includes concatenating the respective root identifiers of the two or more serialized tokens and hashing the result.

19. The computing device claimed in claim 18, wherein the hashing produces a first root identifier within the first bit-space and, as a result, re-hashing the first root identifier until the candidate root identifier is produced.

20. The computing device claimed in claim 14, wherein each leaf identifier indicates a unique path from a root denomination in the defined ordered set of denominations to a respective node corresponding to that leaf identifier in a root denomination tree, wherein the root denomination tree maps splitting of the root denomination into successively smaller denominations in the defined ordered set of denominations.

* * * * *